(12) United States Patent
Golden

(10) Patent No.: US 12,370,030 B2
(45) Date of Patent: Jul. 29, 2025

(54) PATIENT ORAL ATTACHMENT DEVICE WITH AEROSOL VACUUM CAPTURE CAPABILITY FOR USE BY DENTISTS, DENTAL HYGIENISTS AND ORAL SURGEONS

(71) Applicant: Richard Golden, Grosse Pointe Park, MI (US)

(72) Inventor: Richard Golden, Grosse Pointe Park, MI (US)

(73) Assignee: Richard Golden, Grosse Pointe Park, MI (US)

( * ) Notice: Subject to any disclaimer, the term of this patent is extended or adjusted under 35 U.S.C. 154(b) by 399 days.

(21) Appl. No.: 17/985,434

(22) Filed: Nov. 11, 2022

(65) Prior Publication Data

US 2024/0156579 A1 May 16, 2024

(51) Int. Cl.
*A61C 17/08* (2006.01)
(52) U.S. Cl.
CPC ................... *A61C 17/08* (2019.05)
(58) Field of Classification Search
CPC .......... A61C 17/06; A61C 17/08; A61C 17/10
See application file for complete search history.

(56) References Cited

U.S. PATENT DOCUMENTS

| | | | | |
|---|---|---|---|---|
| 730,128 A * | 6/1903 | Jordan | ................ | A61C 17/08 433/93 |
| 2,507,938 A * | 5/1950 | Smith | ................ | A61C 19/001 433/94 |
| 2,644,234 A * | 7/1953 | Scott | ................ | A61C 19/001 433/136 |
| 3,101,543 A * | 8/1963 | Baughan | ................ | A61C 17/08 433/94 |
| 5,127,411 A * | 7/1992 | Schoolman | ............ | A61C 17/06 433/91 |
| 5,378,150 A | 1/1995 | Harrel | | |
| 5,531,722 A | 7/1996 | Van Hale | | |
| 6,309,218 B1 * | 10/2001 | Ellenbecker | ........... | A61C 17/08 600/238 |
| 11,298,495 B1 * | 4/2022 | Robinson | .......... | A61M 16/0666 |
| 11,666,425 B2 * | 6/2023 | Vonderwalde | .......... | A61M 1/86 433/94 |
| 12,144,696 B1 * | 11/2024 | Shah | ................ | A61C 17/08 |
| 2004/0197732 A1 * | 10/2004 | Sullman | ................ | A61C 17/08 433/94 |
| 2019/0223770 A1 | 7/2019 | Malik | | |

(Continued)

FOREIGN PATENT DOCUMENTS

DE            19503780 A1    8/1996

*Primary Examiner* — Ralph A Lewis
(74) *Attorney, Agent, or Firm* — Dinsmore & Shohl LLP

(57) ABSTRACT

An aerosol evacuation device, such as for placement within a patient's mouth while attended to by a dental practitioner having a first conduit extending from a vacuum source and including a rigid tube end portion. A chin support portion extends from a first location of the tube is and adapted to contact an underside location of a chin of the patient. At least one second aerosol capture conduit extends from an attachment portion secured to the rigid tube end portion. A clip is adapted to secure over either of an upper maxilla or a lower mandible jawbone of the patient and to support the at least one conduit extending within the patient's mouth along at least one of outer buccal and inner lingual surfaces.

18 Claims, 7 Drawing Sheets

(56) References Cited

U.S. PATENT DOCUMENTS

| | | | | |
|---|---|---|---|---|
| 2022/0168081 A1* | 6/2022 | Javid | ............ | A61C 17/08 |
| 2022/0257357 A1* | 8/2022 | Root | ............ | A61B 90/40 |
| 2024/0156579 A1* | 5/2024 | Golden | ............ | A61C 17/06 |

* cited by examiner

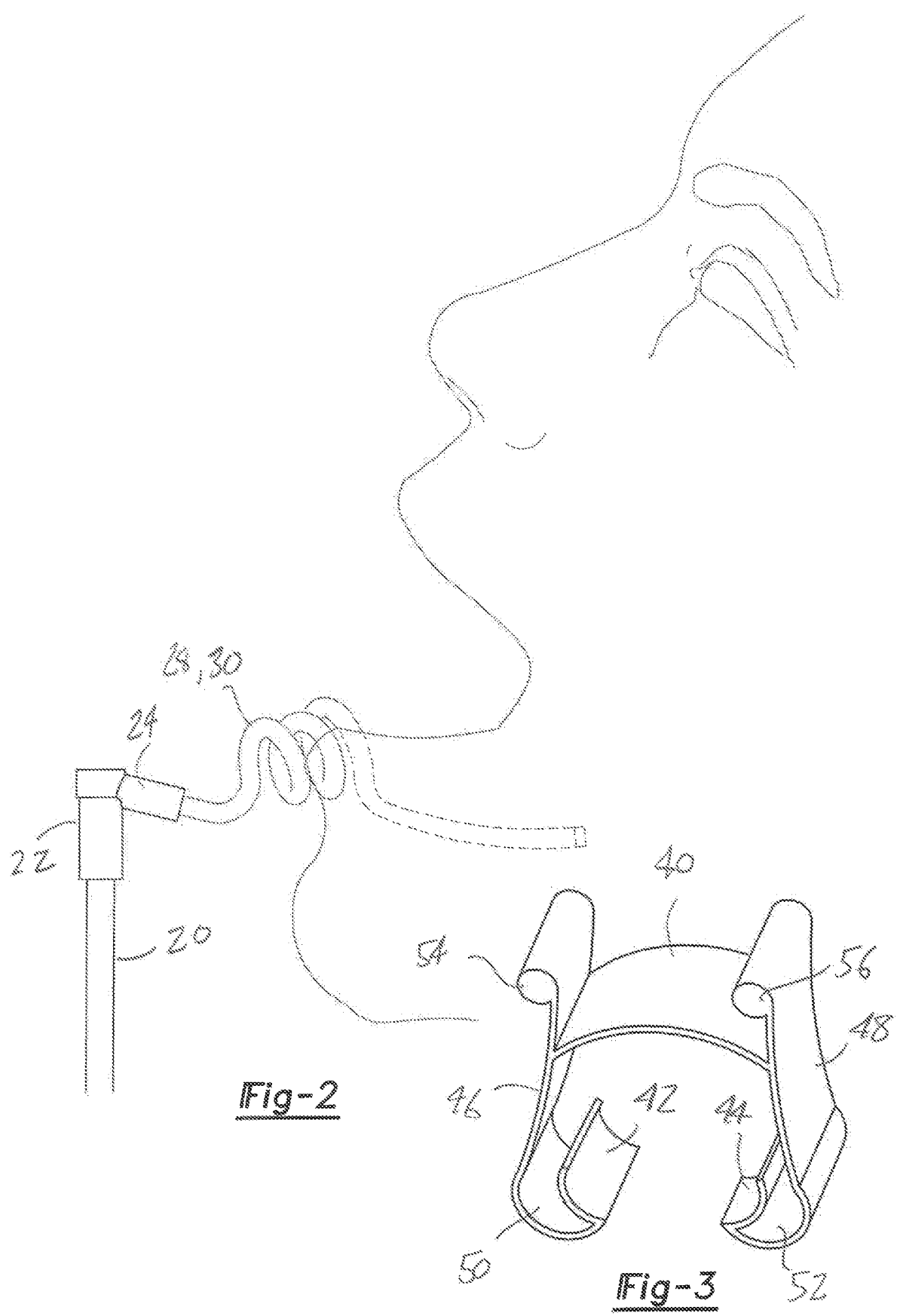

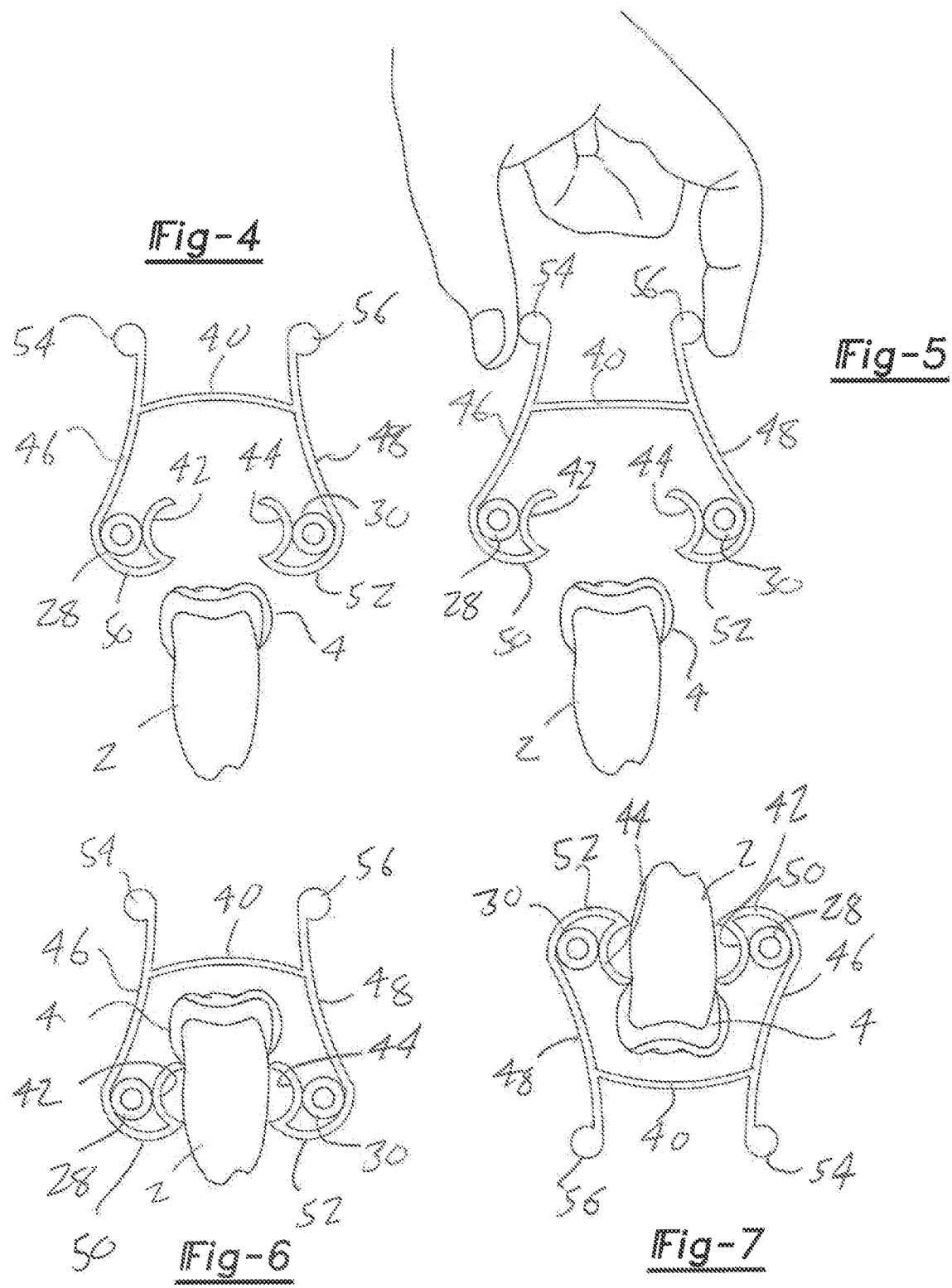

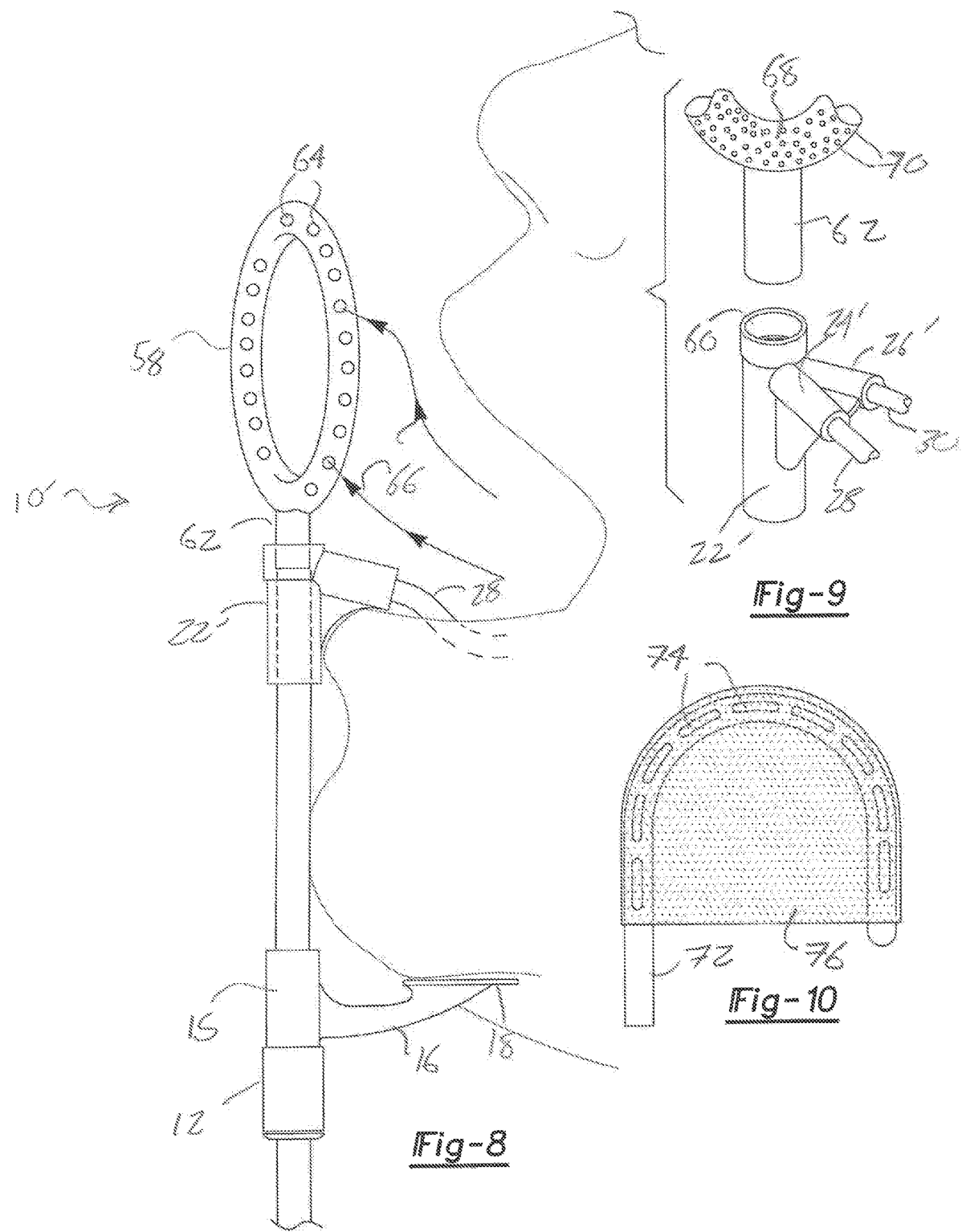

PATIENT ORAL ATTACHMENT DEVICE WITH AEROSOL VACUUM CAPTURE CAPABILITY FOR USE BY DENTISTS, DENTAL HYGIENISTS AND ORAL SURGEONS

FIELD OF THE INVENTION

The present invention relates generally to suction devices, such as for use during oral/dental procedures. More specifically, the present invention discloses an aerosol evacuation or suction device for use during dental procedures and which provides protection to dental professionals who might otherwise be exposed to aerosol dispersed viral or bacterial pathogens resulting from patient exhalation.

BACKGROUND OF THE INVENTION

Suction devices for use by dental professions is known in the art and such as which are utilized to collect spittle and other fluids collecting within the user's mouth over the course of a medical procedure. Such devices however do not provide any protection to the dental professional (e.g. dentists, dental hygienists or oral surgeons) against oral exhalations of a patient who may be afflicted with any disease which is transmittable via viral or bacterial pathogens.

SUMMARY OF THE PRESENT INVENTION

The present invention discloses an aerosol evacuation device, such as for placement within a patient's mouth while attended to by a dental practitioner having a conduit extending from a vacuum source and including a rigid tube end portion. At least one aerosol capture conduit extends from an attachment portion secured to the rigid tube end portion. A clip is adapted to secure over either of an upper maxilla or a lower mandible jawbone of the patient and to support the at least one conduit extending within the patient's mouth along at least one of outer buccal and inner lingual surfaces. Optionally, a chin support portion extends from a first location of the tube is and adapted to contact an underside location of a chin of the patient.

BRIEF DESCRIPTION OF THE DRAWINGS

Reference will now be made to the attached drawings, when read in combination with the following detailed description, wherein like reference numerals refer to like parts throughout the several views, and in which:

FIG. 2 is an environmental side view of the curled vacuum suction tube shown in FIG. 1 in position within a patient's oral cavity;

FIG. 3 is an illustration of a clip portion shown in FIG. 1 for securing over the mandible bone in biasing fashion against both buccal and lingual surfaces;

FIG. 4 is a plan view illustration of the clip positioned above the lower mandible bone;

FIG. 5 is a succeeding view showing a user exerting a pincer force on upper extending portions of the clip, causing lower extending portions to outwardly displace;

FIG. 6 illustrates a further succeeding displacement and release position of the clip for engaging the same over the mandible lower jaw bone;

FIG. 7 is an illustration of an upper maxilla secured clip following a protocol similar to that shown in FIGS. 4-5;

FIG. 8 is an illustration of an aerosol vacuum capture device according to a second embodiment and which can either supplement or replace the jawbone supported clips with a ring shaped and aperture aerosol capture tube supported atop the vacuum suction tube positioned over the patient's mouth and secured in place via an underside adjustable chin support;

FIG. 9 is an exploded view of a sub-variant of a ring shaped aerosol capture tube in exploded fashion above a receiving nipple end of the vacuum suction tube;

FIG. 10 is an illustration of a still further sub-variant of the exterior aerosol capture tube and exhibiting a "U" shaped apertured capture tube provided in combination with a mesh shield covering for preventing flow-through of patient aerosol exhalations;

DETAILED DESCRIPTION OF THE PREFERRED EMBODIMENTS

Figure 1:
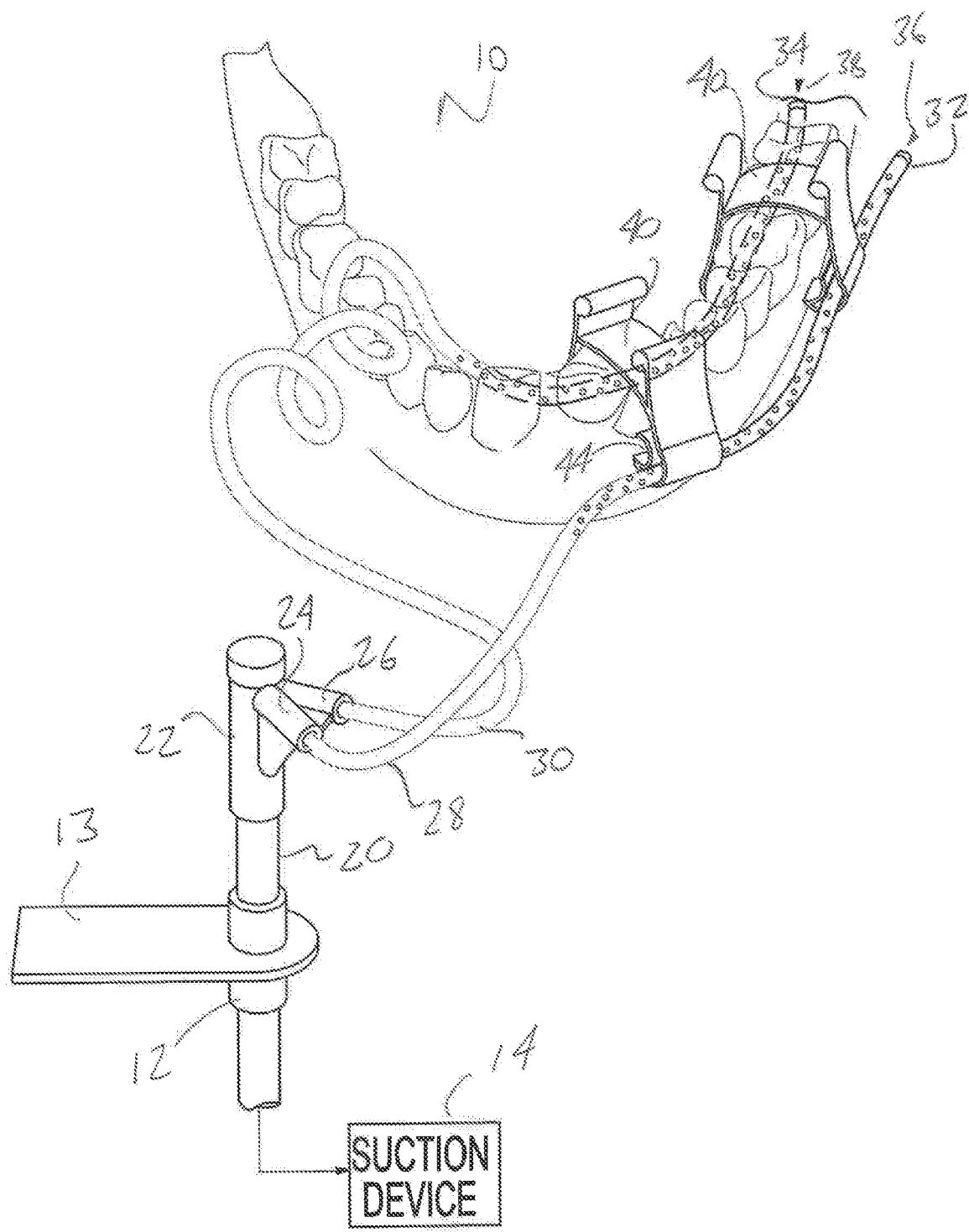
FIG. 1 is a perspective view of the aerosol evacuation device according to one non-limiting embodiment of the present invention and depicting the features of the elongated vacuum suction tube, in combination with the jaw supported clips seating over either or both of the upper maxilla or lower mandible jawbones and including outer buccal and inner lingual supported aerosol vacuum capture tubes.

With reference to the attached illustrations, the present invention discloses an aerosol evacuation or suction device for use during dental procedures and which provides protection to dental professionals who might otherwise be exposed to aerosol dispersed viral or bacterial pathogens resulting from patient exhalation. With reference to FIG. 1, a perspective view, which is generally depicted at 10, of the aerosol evacuation device according to one non-limiting embodiment of the present invention.

The device includes an elongated vacuum suction tube 12 which is connected (such as with the assistance of a bracket 13 or other suitable mounting structure) to a suction or other vacuum/evacuation source 14. The vacuum suction tube 12 can include, without limitation, any of a rigid, semi-rigid or flexible conduit. As is further shown in the alternate variant of FIGS. 8 and 11, an underside chin support portion extends from the tube 12 and includes a collar 15 secured to the tube 12, from which extends a bracket 16 terminating in a pedestal portion (depicted in phantom at 18) which is adapted to support against an underside of a patient's chin.

An upper (typically rigid or semi-rigid) attachment tube end portion 20 is depicted extending upwardly from the flexible tube 12 (also termed a first conduit) and which can also support the collar 15 of the chin support bracket 16 (shown in FIG. 8). A cap attachment 22 (typically a molded plasticized component) is secured atop the upper tube attachment portion 20 and includes a pair of split in-molded conduit support portions 24/26.

A pair of second conduits 28/30 are secured respectively to the in-molded conduit support portions 24/26. The conduits include any of a flex, spiral, curled or other configuration and exhibit extending end locations 32/34 which, upon being positioned within the patient's mouth, provide for vacuum evacuation of aerosol emanations in the immediate zone (see arrows 36/38).

FIG. 2 is a rotated side view of the aerosol vacuum capture device and illustrating the lower chin support portion from another angle in combination with the arrangement of the evacuation tube 12, with upper tube portion 20 and uppermost attachable cap 22, such that the conduits supports 24/26 and extending flex conduits 28/30 extend within the patients oral cavity. As further depicted in FIG. 2, the flex conduits 28/30 can again include any spiraling or curled configuration which provides additional adjustability and self-supporting aspects when placed/supported within a patient's mouth (see as shown in phantom).

As shown in FIGS. 1 and 3, a pair of retaining clips 40 are depicted and which, as shown in FIG. 1, are adapted to seating over either or both of the upper maxilla or lower mandible jawbones of the patient. The clips 40 are constructed of a flexible and resilient and sanitary or antimicrobial grade polymer or spring steel and which includes lower most and reverse angled configured capture ledges 42/44 extending from outer and downwardly extending sides 46/48 associated with an inner cross sectional profile of each clip. The capture ledges, as shown, support both the outer buccal 28 and inner lingual 30 supported aerosol vacuum capture tubes as shown in FIG. 1.

As shown, the clips 40 are arcuate in profile with the capture ledges 42/44 as shown exhibiting arcuate reverse angled portions which extend relative to rounded bottom edge profiles 50/52 of the clips 40. Each clip includes a bridging portion, again depicted at 40, with upper extending portions terminating in rounded and pincer engaging portions 54 and 56.

FIG. 4 is a plan view illustration of the clip 40 positioned above the lower mandible bone as depicted in cross section at 2 with tooth line depicted at 4. FIG. 5 is a succeeding view showing a user exerting a pincer force on upper extending portions 54 and 56 of the clip, causing the lower extending portions 46/48 to outwardly displace so that the lower capture ledges 42/44 are outwardly displaced as shown. FIG. 6 illustrates a further succeeding displacement and release position of the clip in which the bottom edge profiles 50/52 return displace inwardly to engage the same over the mandible lower jaw bone and to support the extending conduits 28/30 in the manner shown. FIG. 7 is an illustration of an upper maxilla secured clip, again at 40, following a protocol similar to that shown in FIGS. 4-5.

Proceeding to FIG. 8, an illustration is shown of an aerosol vacuum capture device according to a second embodiment 10', such as which can either supplement or replace the jawbone supported clips with a ring shaped and aperture aerosol capture tube 58 supported atop the vacuum suction tube 12 and positioned over the patient's mouth. The uppermost attachable cap portion is reconfigured as shown at 22' and includes an uppermost receiving open nipple end 60 (see FIG. 9) over which is resistively attached a downward stem portion 62 of the ring shaped aerosol capture tube 58. As further shown, the ring tube 58 includes a plurality of spaced apart apertures defined by inner extending rim surfaces 64 extending around a circumference of the ring tube and which operate to inwardly draw aerosol flow (see arrows 66) into the tube which have escaped from the patient's mouth and not previously drawn into the inward extending evacuation conduits 28/30.

FIG. 9 is an exploded view of a sub-variant of a ring shaped aerosol capture tube, see at 68 extending upwardly from a hollow engagement stem (again at 62) which is in turn resistance fitted atop the open nipple end of the in exploded fashion above a receiving nipple end of the uppermost cap attachable portion 22' in turn secured to and forming part of the vacuum suction tube 20. Conduits supports 24'/26' are integrated into the upper cap portion 22', and from which extend flex conduits 28/30 within the patients oral cavity. The ring tube 68 can include, without limitation, any different pattern or array of in-flow apertures as shown at 70 for evacuating the patient aerosol emissions.

FIG. 10 is an illustration of a sub-variant of the exterior aerosol capture tube and exhibiting a "U" shaped aperture capture tube with a lower most extending portion 72 for resistively fitting to the open nipple end 60 of the uppermost cap attachable portion 22'. The "U" shaped collection tube is likewise interiorly hollow and includes a plurality of elongated slots 74 extending around its arcuate "U" shape profile, this in combination with a mesh shield covering 76 of a sufficiently fine dimension for entrapping or preventing flow-through of patient aerosol exhalation and in order to provide an additional measure of protection to the dental practitioner.

Figure 11:
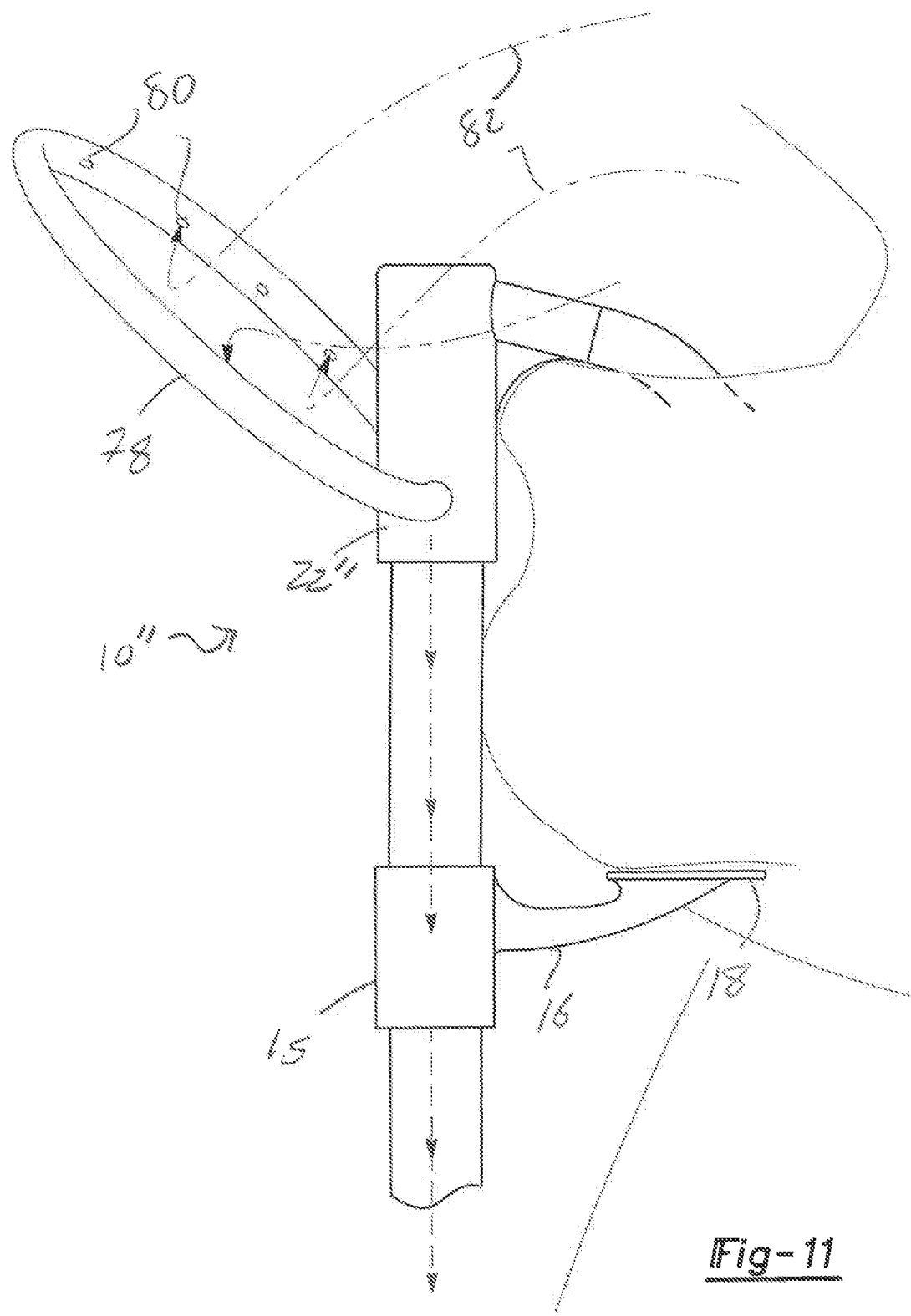
FIG. 11 is an illustration of a further modification of an aerosol vacuum capture device similar to that shown in FIG. 8 exhibiting a rotatable ring shaped aerosol capture tube mounted to the vacuum suction tube and secured in place via an underside adjustable chin support.

FIG. 11 is an illustration of a further modification of an aerosol vacuum capture device, see generally at 10", similar to that shown in FIG. 8 and exhibiting a rotatable ring shaped aerosol capture tube 78 mounted to a further modification of the vacuum suction tube 22" and secured in place via the underside adjustable chin support (see again collar 15 secured to the tube 12, from which extends the bracket 16 terminating in a pedestal portion 18 which is adapted to support against an underside of a patient's chin). As with the variant of FIG. 8, the ring-shaped capture tube 78 can include any variety of apertures (see at 80) for admitting aerosol airflow patterns 82.

Figure 12:
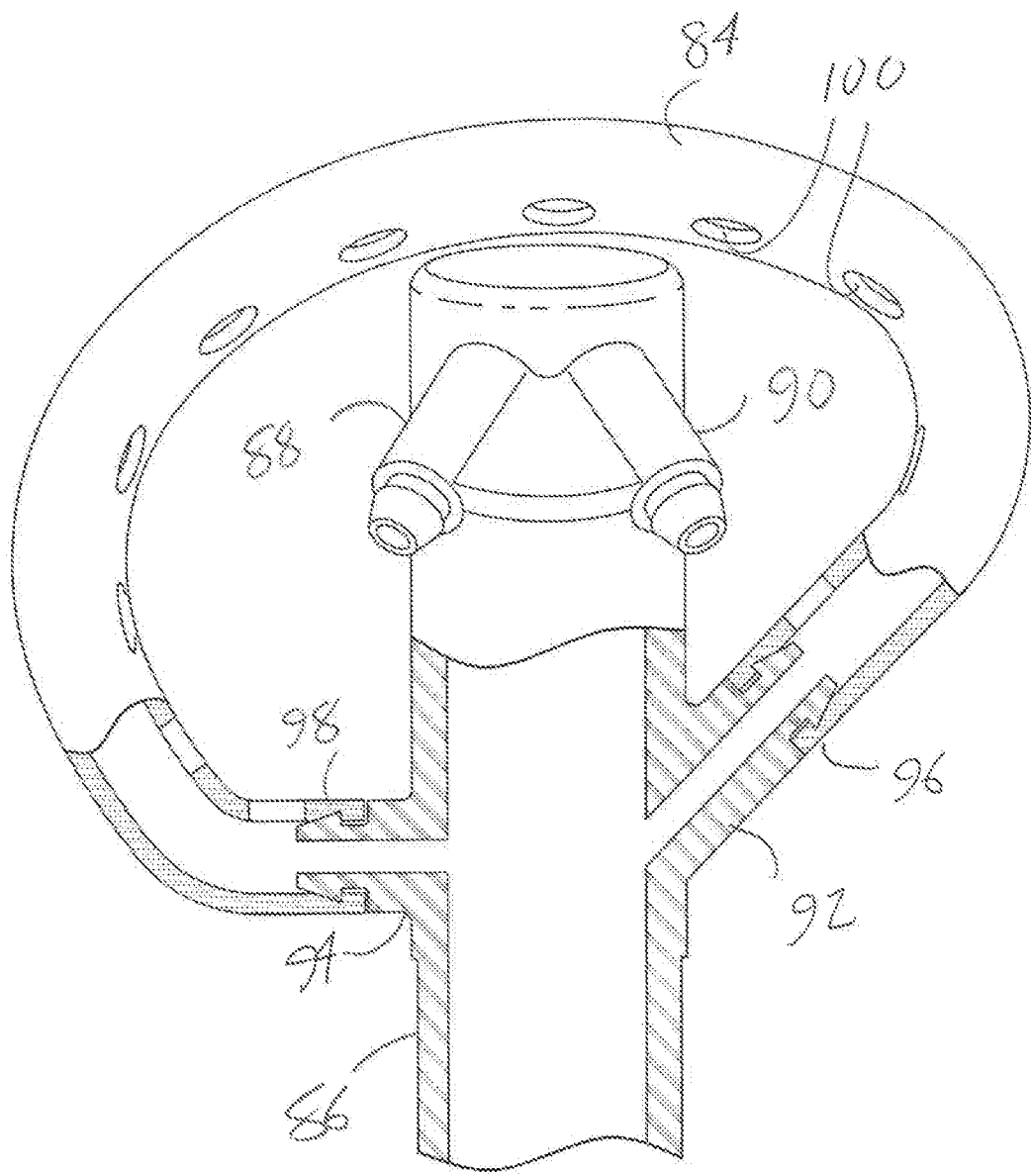
FIG. 12 is a partially cutaway illustration of a further variant of a flexible aerosol capture ring attached to the suction tube.

FIG. 12 is a partially cutaway illustration of a further variant of a flexible aerosol capture ring 84 attached to a further modified suction tube 86. As with prior embodiments, the tube 86 includes conduit supports 88/90 for receiving the separate flexible aerosol conduits 28/30 which are inserted within the patient's oral cavity as previously described. As further shown in cutaway, the reconfigured suction tube 86 includes nipple attachment locations 92/94 for attaching opposite ends 96 and 98 of the capture ring 84 and includes any arrangement of aerosol capture apertures 100.

Figure 13:
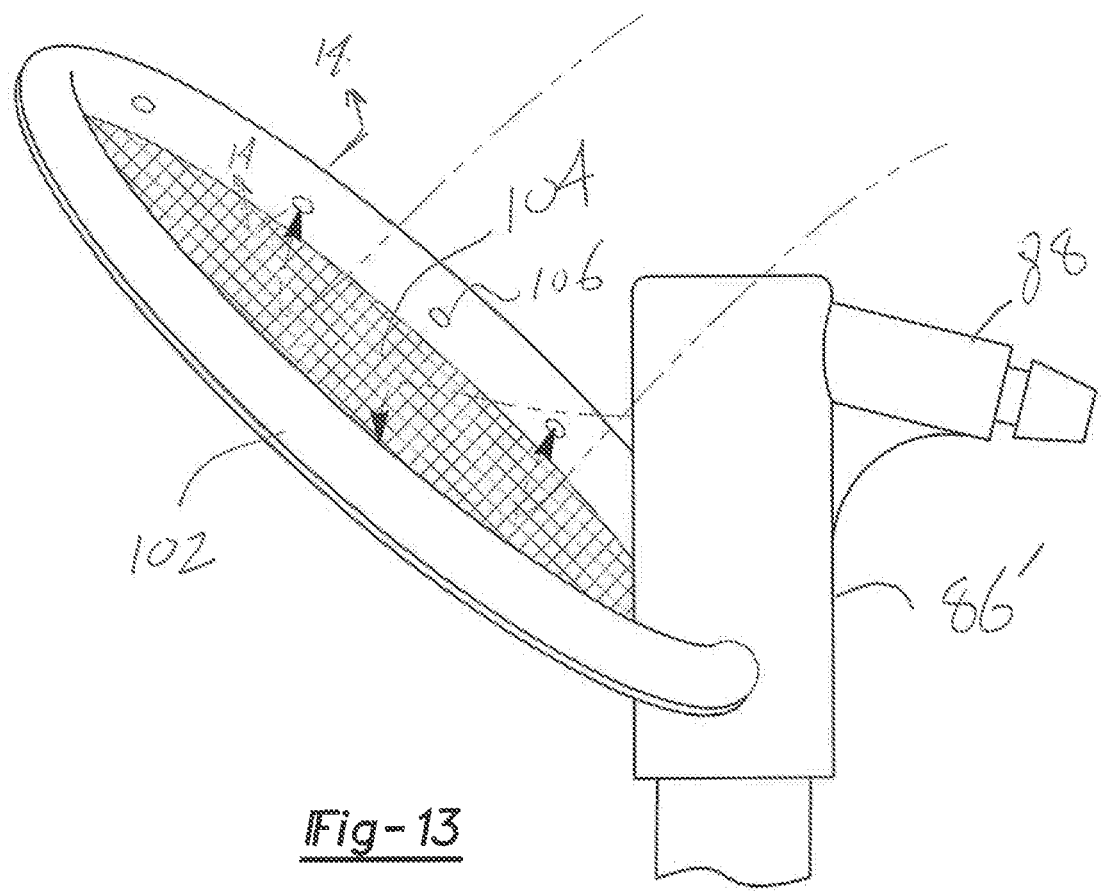
FIG. 13 is an illustration similar to FIG. 11 and showing a further variant of aerosol capture tube and depicting a further variant of mesh screen covering alternate to that shown in the variant of FIG. 10.

FIG. 13 is an illustration similar to FIG. 11 and showing a further variant of the aerosol capture ring, at 102, and additionally depicting a further variant of mesh screen covering 104 alternate to that shown in the variant of FIG. 10. The rigid or semi-rigid tube is slightly redesigned (at 86') from that shown in FIG. 11 and, without limitation, the ring 102 can be fixed to the supporting tube in a fashion which allows it to be pivotally adjustable in order to optimize a capture angle for the patient aerosol emissions.

Figure 14:
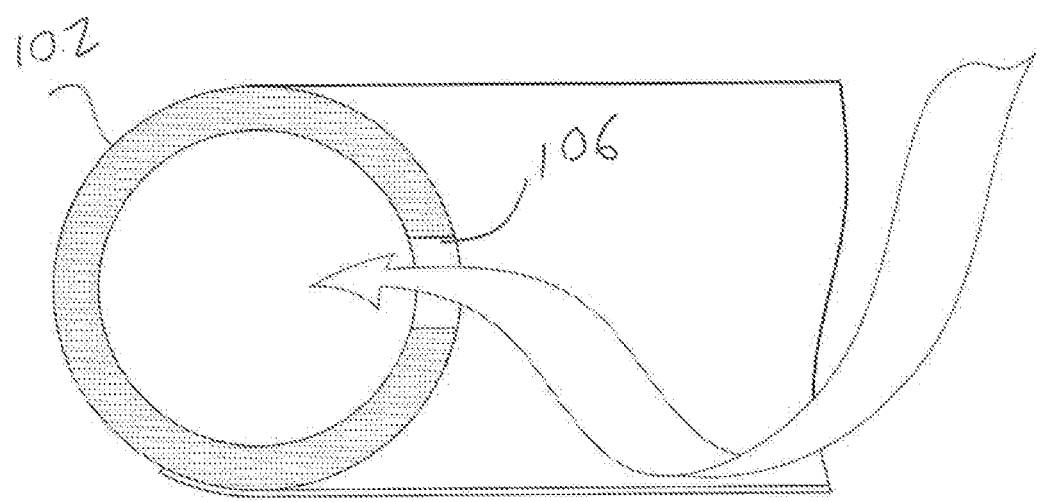
FIG. 14 is a cutaway view taken along line 14-14 of FIG. 13 and better showing the geometry airflow admitting apertures of the aerosol vacuum capture ring.

Finally, FIG. 14 is a cutaway view taken along line 14-14 of FIG. 13 and better showing the geometry airflow admitting apertures, see at 106 of the aerosol vacuum capture ring 102 for receiving the aerosol emission patterns (at 108). In this fashion, any viral or pathogen entrained aerosol emissions, pass centrally within the ring shaped tube for capture and removal. The mesh screen 4 provides additional capture/redirection of the patient aerosol emissions.

Without limitation, the ring shaped capture profile of the patient exterior supported tube (corresponding to any of those depicted at 58 in FIG. 8, at 72 in FIG. 10, at 78 in FIG. 11, at 84 in FIG. 12, or at 102 in FIG. 13) can be adapted for use by any dental practitioner depending upon the given procedure being conducted on the patient (e.g. a dental cleaning may require one array of an exterior capture tube, with another type of dental procedure such as a filling, tooth removal, etc., utilizing a different tube design). As further previously described, the interior extending conduits 28 and 30 and supporting clips 40 can be utilized as required depending upon the requirements of the dental practitioner as to access or safety.

Without limitation, the present invention envisions a variety of configurations for utilizing the aerosol capture device of the present invention both individually and in combination with other attachments and accessories for use by dental practitioners and in order to both provided unimpeded access and viewing of the patient's teeth and mouth interior while utilizing various dental instruments (drills, picks, etc.,) while also minimizing the risk of pathogen laden aerosol emissions of a patient from inadvertently infecting the practitioners.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. An aerosol evacuation device, such as for placement within a patient's mouth while attended to by a dental practitioner, comprising:
    a first conduit extending from a vacuum source and including a tube end portion;
    an aerosol capture conduit extending from an attachment portion secured to said tube end portion; and
    a clip including a bridging portion extending between outer sides having upper pincer engaging portions extending above the bridging portion as well as lower extending portions extending below the bridging portion so that said clip is adapted to secure over either of an upper maxilla or a lower mandible jawbone of the patient and to support said aerosol capture conduit extending within the patient's mouth along at least one of outer buccal and inner lingual surfaces.

2. The device of claim 1, further comprising a chin support portion having a collar secured to said tube end portion, a bracket extending from said collar and terminating in a pedestal portion which is adapted to support against the underside location of the patient's chin.

3. The device of claim 1, further comprising a cap attachment portion secured atop said tube end portion.

4. The device of claim 3, said cap attachment portion further comprising a pair of split in-molded conduit support portions.

5. The device of claim 4, said aerosol capture conduit further comprising first and second capture conduits secured respectively to said in-molded conduit support portions for extending along each of the outer buccal and inner lingual surfaces.

6. The device of claim 3, further comprising a ring shaped aerosol capture tube separate from said aerosol capture conduit, said ring shaped aerosol capture tube connected at opposite ends to said cap attachment portion and positioned over and outside of the patient's mouth.

7. The device of claim 6, said cap attachment portion further comprising nipple attachment locations over which are resistively attached said opposite ends of said ring shaped aerosol capture tube.

8. The device of claim 7, said ring shaped tube further comprising a plurality of spaced apart apertures defined by inner extending rim surfaces extending around a circumference thereof and which operate to inwardly draw aerosol flow into said ring tube which have escaped from the patient's mouth.

9. The device of claim 6, said uppermost attachable cap portion further comprising an uppermost receiving open nipple end over which is resistively attached a downward stem portion of a "U" shaped aperture capture tube.

10. The device of claim 9, said "U" shaped tube further comprising a lower most extending portion for resistively fitting to said open nipple end of said cap attachable portion.

11. The device of claim 10, said "U" shaped collection tube further comprising an interiorly hollow body including a plurality of elongated slots extending around its arcuate "U" shape profile.

12. The device of claim 11, further comprising a mesh shield covering for entrapping or preventing flow-through of patient aerosol exhalation.

13. The device of claim 1, said clip further comprising a pair of retaining clips adapted to seat over either or both of the upper maxilla or lower mandible jawbones of the patient.

14. The device of claim 13, further comprising said clips being constructed of a flexible and resilient and sanitary or anti-microbial grade polymer or spring steel.

15. The device of claim 14, said clips each further comprising lower most and reverse angled configured capture ledges extending from outer and downwardly extending sides associated with an inner cross sectional profile of each clip and supporting both said outer buccal and inner lingual supported aerosol vacuum capture tubes.

16. The device of claim 15, further comprising said clips each being arcuate in profile with said capture ledges exhibiting arcuate reverse angled portions which extend relative to rounded bottom edge profiles.

17. The device of claim 1, further comprising a chin support portion extending from a first location of said tube end portion and adapted to contact an underside location of a chin of the patient.

18. The device of claim 1, said aerosol capture conduit further comprising a curled or spiral pattern to facilitate positioning within the patient's oral cavity.

\* \* \* \* \*